United States Patent
Son et al.

(10) Patent No.: US 11,715,329 B2
(45) Date of Patent: Aug. 1, 2023

(54) FACE VERIFICATION METHOD AND APPARATUS

(71) Applicant: Samsung Electronics Co., Ltd., Suwon-si (KR)

(72) Inventors: Changyong Son, Anyang-si (KR); Wonsuk Chang, Hwaseong-si (KR); Deoksang Kim, Hwaseong-si (KR); Dae-Kyu Shin, Suwon-si (KR); Byungin Yoo, Seoul (KR); Seungju Han, Seoul (KR); Jaejoon Han, Seoul (KR); Jinwoo Son, Seoul (KR); Chang Kyu Choi, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 81 days.

(21) Appl. No.: 17/111,912

(22) Filed: Dec. 4, 2020

(65) Prior Publication Data

US 2021/0089755 A1 Mar. 25, 2021

Related U.S. Application Data

(63) Continuation of application No. 16/904,635, filed on Jun. 18, 2020, now Pat. No. 10,891,466, which is a (Continued)

(30) Foreign Application Priority Data

Mar. 28, 2017 (KR) ........................ 10-2017-0039524

(51) Int. Cl.
*G06K 9/00* (2022.01)
*G06V 40/16* (2022.01)
(Continued)

(52) U.S. Cl.
CPC ............ *G06V 40/167* (2022.01); *G06F 18/22* (2023.01); *G06V 10/761* (2022.01);
(Continued)

(58) Field of Classification Search
CPC .... G06V 40/171; G06V 40/172; G06V 10/10; G06V 40/45; G06V 40/174;
(Continued)

(56) References Cited

U.S. PATENT DOCUMENTS 1,277,831 A1 10/2007 Pawelzik et al.
8,515,139 B1* 8/2013 Nechyba ............... G06V 40/171
382/118
(Continued)

FOREIGN PATENT DOCUMENTS

JP 2007-156974 A 6/2007
JP 2009-163555 A 7/2009
(Continued)

OTHER PUBLICATIONS

Final Office Action dated Jan. 19, 2023, in related U.S. Appl. No. 17/677,275 (8 pages in English).

*Primary Examiner* — Tuan H Nguyen
(74) *Attorney, Agent, or Firm* — NSIP Law

(57) ABSTRACT

Disclosed is a face verification method and apparatus. The method including analyzing a current frame of a verification image, determining a current frame state score of the verification image indicating whether the current frame is in a state predetermined as being appropriate for verification, determining whether the current frame state score satisfies a predetermined validity condition, and selectively, based on a result of the determining of whether the current frame state score satisfies the predetermined validity condition, extracting a feature from the current frame and performing verification by comparing a determined similarity between the
(Continued)

extracted feature and a registered feature to a set verification threshold.

22 Claims, 11 Drawing Sheets

Related U.S. Application Data continuation of application No. 15/833,292, filed on Dec. 6, 2017, now Pat. No. 10,733,424.

(51) Int. Cl.
*G06V 40/40* (2022.01)
*G06F 18/22* (2023.01)
*G06V 10/74* (2022.01)

(52) U.S. Cl.
CPC .......... *G06V 40/161* (2022.01); *G06V 40/171* (2022.01); *G06V 40/172* (2022.01); *G06V 40/174* (2022.01); *G06V 40/45* (2022.01)

(58) Field of Classification Search
CPC ...... G06V 40/167; G06V 40/161; G06K 9/00; G06K 9/62; G06K 9/78; G06K 9/00281; G06K 9/00228; G06K 9/00302; G06K 9/00906; G06K 9/00288; G06K 9/00261; G06K 9/6215

See application file for complete search history.

(56) References Cited

U.S. PATENT DOCUMENTS

| | | |
|---|---|---|
| 2008/0316327 A1 | 12/2008 | Steinberg et al. |
| 2012/0044384 A1 | 2/2012 | Shibagami |
| 2016/0180183 A1* | 6/2016 | Bourdev ............... G06V 10/761 382/115 |
| 2017/0024608 A1 | 1/2017 | Kons |
| 2018/0096503 A1* | 4/2018 | Kaehler ............... G06V 40/197 |

FOREIGN PATENT DOCUMENTS

| | | |
|---|---|---|
| JP | 2017-33357 A | 2/2017 |
| KR | 10-2013-0104682 A | 9/2013 |
| KR | 10-1601423 B1 | 3/2016 |

* cited by examiner

Estimating landmarks     Extracting correspondence pair of points

FIG. 9
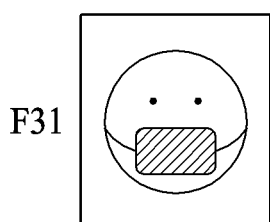
Registration image
F31
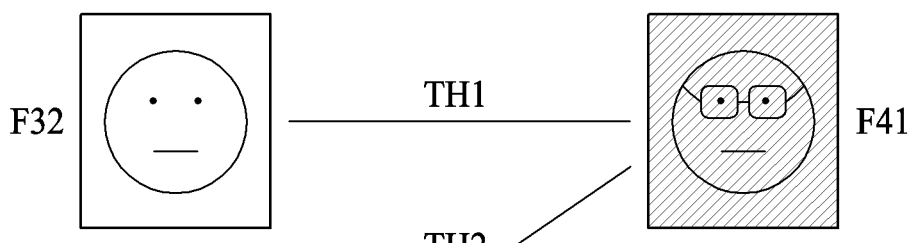
F32  TH1  F41
     TH2
F33         F42
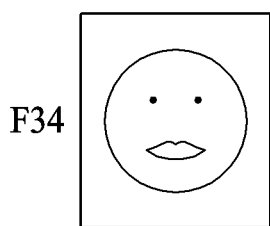
F34

FACE VERIFICATION METHOD AND APPARATUS

CROSS-REFERENCE TO RELATED APPLICATION(S)

This application is a continuation of U.S. patent application Ser. No. 16/904,635, filed on Jun. 18, 2020, which is a continuation of U.S. patent application Ser. No. 15/833,292, filed on Dec. 6, 2017, now U.S. Pat. No. 10,733,424, issued on Aug. 4, 2020, which claims the benefit under 35 USC § 119(a) of Korean Patent Application No. 10-2017-0039524 filed on Mar. 28, 2017, in the Korean Intellectual Property Office, the entire disclosures of all of which are incorporated herein by reference for all purposes.

BACKGROUND

1. Field

The following description relates to face verification method and apparatus.

2. Description of Related Art

Face verification technology is a biometric authentication technology that may determine whether a user is valid based on a face appearing in a static image or a moving image. Face verification technology has an advantage that contactless verification may be performed on a verification target. Recently, face authentication technology may be used in various applicable fields such as a security system, a mobile authentication, and multimedia data search because of convenience and efficiency of the face verification technology.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a processor implemented verification method includes acquiring a verification image, analyzing a current frame of the verification image and determining a current frame state score of the verification image indicating whether the current frame is in a state predetermined as being appropriate for verification, determining whether the current frame state score satisfies a predetermined validity condition, and selectively, based on a result of the determining of whether the current frame state score satisfies the predetermined validity condition, extracting a feature from the current frame and performing verification by comparing a determined similarity between the extracted feature and a registered feature to a set verification threshold.

The verification threshold may be dynamically set based on a determined situation of the current frame and/or a determined similarity between the situation of the current frame and a situation of the registered feature.

The situation of the current frame and the situation of the registered feature, may respectively include, with respective respect to the current frame and a registration image from which the registered feature was extracted, information of one or more or any combination of a face region size, a degree of eyelid closure, a liveness, an elapsed time from an image capturing operation start, an image brightness, a degree of facial occlusion, and a facial expression.

The verification threshold may be dynamically set to require a lesser similarity, for a determination of verification success, between features of the verification image and features of a corresponding registration image when the situation of the current frame and situation of a frame of the registration image are determined to be similar, than when the situation of the current frame and situation of another frame of the registration image are determined to be less similar.

The method may further include discarding the current frame in response to the current frame state score not satisfying the validity condition and not extracting the feature from the current frame and performing the verification for the current frame, determining a subsequent frame state score indicating whether a subsequent frame is in a state predetermined as being appropriate for verification, and performing verification using the subsequent frame in response to the subsequent frame state score satisfying the validity condition.

The current frame state score may be determined based on analyses of, with respect to the current frame, at least one of a face region size, a degree of eyelid closure, a liveness, an elapsed time from an image capturing operation start, an image brightness, a degree of facial occlusion, or a facial expression.

The analyzing of the current frame may include detecting a face region in the current frame, and determining the current frame state score by comparing a size of the detected face region to a predetermined acceptable range.

The analyzing of the current frame may include estimating a landmark corresponding to a facial feature element in the current frame, extracting a correspondence pair of points located in an upper portion and a lower portion of an eye from the estimated landmark, determining a degree of eyelid closure based on the extracted correspondence pair, and determining the current frame state score based on the determined degree of eyelid closure.

The analyzing of the current frame may include determining a liveness score of the current frame based on a liveness test for the current frame, comparing the liveness score to a liveness threshold to determine a liveness parameter indicating whether the current frame is based on an image in which an actual user is captured, and determining the current frame state score based on the liveness parameter.

The method may further include adjusting the liveness threshold based on determinations of at least one of a face region size, a degree of eyelid closure, an elapsed time from a camera operation start, an image brightness, a degree of facial occlusion, or a facial expression obtained based on a result of the analyzing of the current frame.

The method may further include gradually reducing the liveness threshold from a predetermined first value to a predetermined second value as an image quality of the verification image is being stabilized after a camera capturing the verification image starts to operate.

The method may further include adjusting the verification threshold based on at least one of the result of the analyzing of the current frame and the current frame state score.

The adjusting of the verification threshold may include adjusting the verification threshold such that a verification difficulty increases in response to the current frame state score decreasing.

The adjusting of the verification threshold may include adjusting the verification threshold based on determinations of at least one of a face region size, a degree of eyelid closure, a liveness, an elapsed time from a camera operation start, an image brightness, a degree of facial occlusion, or a facial expression obtained based on a result of the analyzing of the current frame.

In response to a determination that a factor affecting an eyelid closure detected from the current frame based on a result of the analyzing of the current frame is a sleep state, the current frame may be discarded and verification is performed using a subsequent frame of the verification image.

The method may further include outputting a message to induce a user to open eyes on a screen in response to a determination that a factor affecting an eyelid closure is a sleep state based on a result of the analyzing of the current frame.

The method may further include acquiring a registration image, analyzing a current frame of the registration image and determining a current frame state score of the registration image indicating whether the current frame of the registration image is appropriate for registration, extracting a feature from the current frame of the registration image in response to the current frame state score of the registration image satisfying the validity condition, and storing the feature extracted from the current frame of the registration image and a result of the analyzing of the current frame of the registration image.

In the analyzing of the current frame of the registration image, a size of a face region in the current frame of the registration image may be compared to a first acceptable range, and, in the analyzing of the current frame of the verification image, a size of a face region in the current frame of the verification image may be compared to a second acceptable range, the second acceptable range being greater than the first acceptable range.

The method may further include dynamically setting the verification threshold based on a comparison of a result of the analyzing of the current frame in the registration image to a result of the analyzing of the current frame in the verification image.

The dynamically setting of the verification threshold may include setting the verification threshold such that a verification difficulty increases in response to a difference between the result of the analyzing of the current frame in the registration image and the result of the analyzing of the current frame in the verification image increasing.

The dynamically setting of the verification threshold may include, in response to a determination that a situation in which the current frame in the verification image is captured is different from situations in which the registration image is captured, the determination being based on a comparison between the result of the analyzing of the current frame in the registration image and the result of the analyzing of the current frame in the verification image, setting the verification threshold to be maintained or adjusted such that the verification difficulty is reduced.

In a general aspect, provided is a non-transitory computer-readable medium storing instructions, which when executed by a processor, cause the processor to implement one or more or all operations described herein.

In one general aspect, verification apparatus includes a processor configured to acquire a verification image, analyze a current frame of the verification image, determine a current frame state score of the verification image indicating whether the current frame is in a state predetermined as being appropriate for verification, determine whether the current frame state score satisfies a predetermined validity condition, and selectively, based on a result of the determining of whether the current frame state score satisfies the predetermined validity condition, extract a feature from the current frame and perform verification by comparing a determined similarity between the extracted feature and a registered feature to a set verification threshold.

The apparatus may further include a memory storing computer readable instructions, which when executed by the processor, cause the processor to perform the acquiring of the verification image, the analyzing of the current frame of the verification image, the determining of the current frame state score, the determining of whether the current frame state score satisfies the predetermined validity condition, and the selectively performing of the extracting of the feature from the current frame and the verification.

The processor may be further configured to dynamically set the verification threshold based on a determined situation of the current frame and/or a determined similarity between the situation of the current frame and a situation of the registered feature.

The situation of the current frame and the situation of the registered feature, may respectively include, with respective respect to the current frame and a registration image from which the registered feature was extracted, information of one or more or any combination of a face region size, a degree of eyelid closure, a liveness, an elapsed time from an image capturing operation start, an image brightness, a degree of facial occlusion, and a facial expression.

In one general aspect, a processor implemented verification method includes analyzing a current frame of a registration image and determining a current frame state score of the registration image indicating whether the current frame of the registration image is in a state predetermined as being appropriate for registration, determining whether the current frame state score satisfies a predetermined validity condition, selectively, based on a result of the determining of whether the current frame state score satisfies the predetermined validity condition, extracting a feature from the current frame of the registration image and storing the extracted feature and information derived from the analyzing of the current frame of the registration image, and performing verification of a frame of a verification image based on one or more extracted features of the registration image and a verification threshold that is dependent on the stored information derived from the analyzing of the current frame or stored situation information of another frame of the registration image.

The verification threshold may be dynamically set based on a determined situation of the frame of the verification image and/or a determined similarity between the situation of the frame of the verification image and a situation of the current frame of the registration image or a situation of the other frame of the registration image.

In one general aspect, a verification apparatus includes a processor configured to perform a verification of a subject included in a verification image based a comparison of one or more extracted features of the verification image and one or more features derived from a registration image, based on a set verification threshold, wherein the verification threshold is dynamically set by the processor based on a determined situation corresponding to the one or more extracted features of the verification image and/or a determined similarity between the situation corresponding to the one or more extracted features of the verification image and a situation corresponding to the one or more features derived from the registration image.

The processor may be configured to dynamically set the verification threshold to require a lesser similarity, for a determination of verification success, between the one or more extracted features of the verification image and the one or more features derived from the registration image when the situation corresponding to the one or more extracted features of the verification image and the situation corresponding to the one or more extracted features derived from the registration image are determined to be similar, than when the situation corresponding to the one or more extracted features of the verification image and a situation corresponding to other one or more features derived from the registration image are determined to be less similar.

The processor may be further configured to perform a preliminary determining of whether the verification image is in a state predetermined as being appropriate for verification, and the processor may selectively perform an extracting, of the verification image for the one or more extracted features of the verification image, and the verification based on a result of the preliminary determining.

The apparatus may further include a memory, wherein the situation corresponding to the one or more extracted features derived from the registration image is reflected in a state score, stored in the memory, of a frame of the registration image and reflecting results of an analysis of a situation of the frame of the registration image, and wherein the processor is configured to dynamically set the verification threshold based on a comparison of the state score of the frame of the registration image and a determined state score for a frame of the verification image reflecting an analysis of a situation of the frame of the verification image.

The state score of the frame of the registration image and the state store of the frame of the verification image, may be respectively based on analyses, with respective respect to the registration image and the verification image, of information of one or more or any combination of a face region size, a degree of eyelid closure, a liveness, an elapsed time from an image capturing operation start, an image brightness, a degree of facial occlusion, and a facial expression.

The processor may be configured to dynamically set the verification threshold based on a determined state score of a frame of the verification image reflecting an analysis of the situation corresponding to the one or more extracted features of the verification image, wherein the situation corresponding to the one or more extracted features of the verification image includes, with respect to the verification image, information of one or more or any combination of a face region size, a degree of eyelid closure, a liveness, an elapsed time from an image capturing operation start, an image brightness, a degree of facial occlusion, and a facial expression.

The processor may be configured to dynamically set the verification threshold based on the determined similarity between the situation corresponding to the one or more extracted features of the verification image and the situation corresponding to the one or more features derived from the registration image, wherein the situation corresponding to the one or more extracted features of the verification image and the situation corresponding to the one or more features derived from the registration image, respectively include, with respective respect to the registration image and the verification image, information of one or more or any combination of a face region size, a degree of eyelid closure, a liveness, an elapsed time from an image capturing operation start, an image brightness, a degree of facial occlusion, and a facial expression.

Other features and aspects will be apparent from the following detailed description, the drawings, and the claims.

BRIEF DESCRIPTION OF THE DRAWINGS

FIG. 9 is a diagram illustrating an example of a verification process based on analyses results of one or more registration images and analyses results of one or more verification images.

Figure 1:
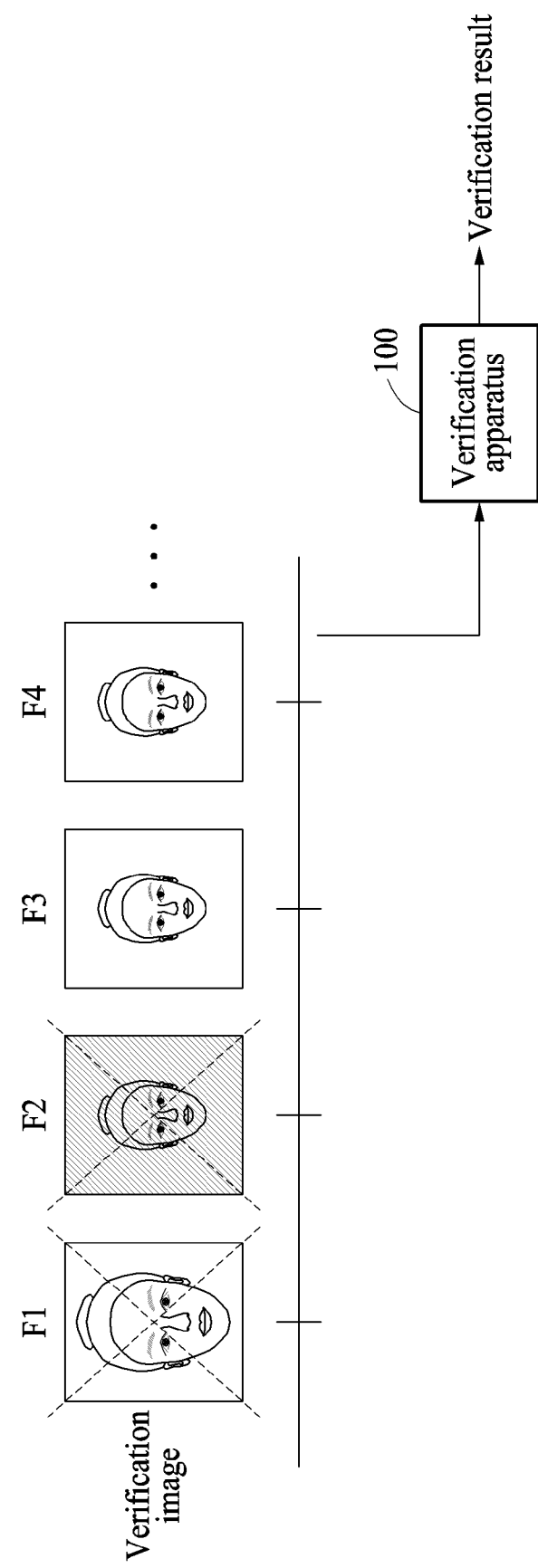
FIG. 1 is a diagram illustrating an example of a verification system.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. The sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

The terminology used herein is for the purpose of describing particular examples only, and is not to be used to limit the disclosure. For example, as used herein, singular forms are intended to include plural forms as well, unless the context clearly indicates otherwise. As used herein, the singular forms "a," "an," and "the" are intended to include the plural forms as well, unless the context clearly indicates otherwise. As used herein, the terms "include, "comprise," and "have" specify the presence of stated features, numbers, operations, elements, components, and/or combinations thereof in an example embodiment, but do not preclude the presence or addition of one or more other features, numbers, operations, elements, components, and/or combinations thereof in alternative embodiments, nor the lack of such stated features, numbers, operations, elements, components, and/or combinations in further alternative embodiments unless the context and understanding of the present disclosure indicates otherwise. In addition, the use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIG. 1 is a diagram illustrating an example of a verification system. A verification apparatus 100 performs face verification based on a verification image and outputs a verification result. For example, the verification apparatus 100 includes one or more processors configured to perform the face verification based on the verification image and to output the verification result. The verification image may be an image captured by a camera or image sensor of the face verification apparatus 100, externally provided, or acquired from or provided by a local memory or other processing operation of the verification apparatus 100. The verification result indicates whether a face included in the verification image corresponds to a valid user, for example. When the face included in the verification image corresponds to the valid user, the verification result includes information indicating that verification has succeeded, for example. When the face included in the verification image does not correspond to the valid user, the verification result may alternatively include information indicating that the verification has failed. In an alternate example, where face verification is automatically performed or performed in a background operation, e.g., without request or potential knowledge of the user, a successful or failed verification result may not be reported to the user, but rather used to control/institute additional operations or may be provided to another device or server that may receive or monitor results of the face verification or results of face verifications of one or more captured faces from one or more such verification apparatuses. The verification result may further be used for implementing or initiating further processing of the face verification apparatus 100, such as further processing operations in which user verification may be beneficial or required. As only examples, when the face included in the verification image is verified as a face of the valid user by the face verification apparatus 100, the face verification apparatus 100 may unlock a user interface of the face verification apparatus 100, such as when the face verification apparatus 100 is a user terminal, e.g., a smart phone or tablet, and the unlocking enables the user to access additional information or perform additional functions of user terminal, or the verification apparatus 100 may control or indicate to an external device to permit entry of a user to a restricted area due to the face verification, or may authorize financial transactions to proceed or be initiated, as well as alternative operations or processes depending on embodiment.

The face verification is performed by comparing information on one or more verification images to information on one or more registration images. For example, a valid user registers a face image with the verification apparatus 100 through the capturing of a registration image, e.g., by the verification apparatus, either automatically or upon user control. For example, a camera of the user terminal may capture one or more images and provide the captured image(s) to the processor of the verification apparatus 100 as an input image. As non-limiting examples, the processor of the verification apparatus may be one or more general processors of the verification apparatus 100 that control additional operations of the example user terminal, or may be specialized processors specially configured for the face verification, e.g., as a GPU, reconfigurable processor, or specialized neural network or machine learning accelerated processor. When in the verification process of the verification apparatus 100 the input image may be referred to as the verification image, while in the registration process of the verification apparatus 100 the input image may be referred to as the registration image. In the registration process, the verification apparatus 100 extracts features from the face of the valid user and stores the extracted features. The verification apparatus 100 may store additional information about the registration image, such as information about the situation of the registration image, which may be used during the verification operation to control a verification reference of a verification image, e.g., based on comparisons between situation information of the registration image and determined situation information of the verification image. When the user registration is completed, and when a verification image is received, the verification apparatus 100 may analyze the verification image, and if a result of the analysis meets a one or more initial set state conditions, extract feature(s) from the face of the user in the verification image and perform the face verification by comparing the feature(s) extracted from the verification image and feature(s) of the registration image(s) stored in advance based on a set verification reference.

The verification apparatus 100 may be configured merely to perform one or more or all registration operations herein without verification, one or more or all verification operations herein without performing the registration, or may be configured to perform any one or any combinations of the registration operations and verification operations. In an example, one verification apparatus 100 may capture a registration image, that verification apparatus 100 or another verification apparatus 100 may perform image registration, and that verification apparatus 100, the other verification apparatus 100, and/or still another verification apparatus 100 may capture the verification image, and any of the verification apparatuses 100 or still a further verification apparatus 100 may perform the verification of the verification image based on the registered image, e.g., as registered and stored by any of such verification apparatuses 100. Such verification apparatuses 100 may be in communication and share, or respectively provide from respective storing of the same, any registration image(s), any other image registration information, any verification images, and/or any other verification information. Thus, though examples below may refer to a verification apparatus 100 acquiring a registration image, performing registration, acquiring a verification image, and performing verification as well as additional operations, embodiments are not limited to a single verification apparatus 100 generating all such data, performing all such operations, or authorizing or implementing further operations of functions of a/the user device based on success or non-success results of the verification.

As noted above, whether as the registration image or the verification image, an input image may be captured in various situations, as various determinable and differentiable aspects of the input image, aspects of how/when the image is/was captured, and/or aspects of the image capturing device, or any combination of such variously determinable and differentiable aspects. As a non-limiting example, at least one of a face region size, a degree of eyelid closure, a liveness, an elapsed time from a camera operation start, an image brightness, a degree of facial occlusion, or a facial expression, or any combination of the same, may each or collectively indicate a situation for an input image. For example, an ultimate verification accuracy may be greater when a situation of the registration image is similar to a situation of the verification image, such as when a face region size in the registration image is similar to a face region size of the verification image, or when a facial expression in the registration image is similar to a facial expression in the verification image. When the verification accuracy is greater, a false acceptance rate (FAR) accordingly becomes reduced, or a verification attempt using a fake image instead of an actual face of a user may be more likely rejected during the verification process. In this example, the FAR indicates a degree to which an image of the invalid user is recognized as an image of the valid user, and the fake image may be a non-live image of the valid user, for example. In such examples, when the face region size in the verification image is excessively large or excessively small in comparison to the face region size of the registration image, the FAR may increase or the verification attempts with fake images may not be properly rejected.

Thus, in an example, a verification reference may be dynamically determined for each verification image whose features are extracted and compared to features of the registration image, such as based on collective or various determined differences and/or similarities between situations of a particular verification image and a particular registration image. Various feature extraction and comparison approaches or algorithms may be implemented for comparing the verification image and the registration image, e.g., with the example dynamic changed verification reference. When the verification reference is set high, an example output probability of a match (e.g., a result of the comparison) between the verification image and the registration image will have to meet the higher verification reference for the verification to be determined a success, i.e., a match, while when the verification reference is set low, an example output probability of a match (e.g., a result of the comparison) between the verification image and the registration image will only have to meet the lower verification reference for the verification to be determined a success, i.e., the match. Thus, with a higher verification reference there is a required greater determined confidence level between the verification image and the registration image for a verification success, while with the lower verification reference there is only a lower or required minimum determined confidence level between the verification image and the registration image for the verification success. The example verification references may be represented or implemented by respective verification thresholds, for example, noting that embodiments are not limited thereto.

In addition, in examples, registration and/or verification may be selectively performed on select frame(s) of plural captured frames of an input image based on a determined state of the frame and a predetermined minimum state threshold before actually performing the registration and/or the verification the captured plural frames of input image, to increase the verification accuracy. For example, a verification accuracy may be improved through a preprocessing performed by strictly applying conditions for the registration and/or verification with respect to the input image to extract out, or not further consider, those frames that are found to not meet the applied conditions, and thus, inappropriate for the registration and/or the verification, or to select from among the captured frames of the input image those frames that that are determined sufficiently appropriate for the subsequent registration and/or the verification processes. Thus, although such a preprocessing may be performed on all frames in an input image, the subsequent feature extraction and recognition process that may have a relatively high complexity may be performed on only those non-excluded frames or those selected frames, which may provide for quicker overall registration and/or verification processings, compared to a scheme in which such feature extraction and recognition process is performed on all captured frames of the input image.

For example, the verification apparatus 100 may analyze each frame included in the input image to determine whether the corresponding frame is in a state appropriate for the subsequent registration and/or the verification operations. Such a state appropriateness analysis may include considering individually or collectively a situation of each frame, including analyzing at least one of a face region size, a degree of eyelid closure, a liveness, an elapsed time from a camera operation start, an image brightness, a degree of facial occlusion, or a facial expression, or any combination of the same. In an example, based on a result of that state appropriateness analysis only the determined most appropriate frames may be further respectively processed for registration or verification. In this example, a collective or individual, e.g., respective for the different example situations, state score may be derived indicating whether a predetermined frame included in the input image is sufficiently in a respective state appropriate for the registration and/or the verification processing. For example, the verification apparatus 100 may determine such a state score for a frame based on an analysis result of the frame in the input image, and then determine whether the frame is in the appropriate state for the registration and/or the verification. If yes, then the frame may then be further processed, e.g., with the appropriate feature extraction and further processing, for either the registration or verification.

Referring to FIG. 1, the verification image includes a plurality of frames. A face region size of a frame F1 is larger in comparison to a predetermined acceptable value. An illumination of a frame F2 is less than a predetermined acceptable value. Thus, the frames F1 and F2 are in respective states that may typically be inappropriate for the verification. In this example, the verification apparatus 100 analyzes the frames F1, F2, F3, and F4, discards the frames F1 and F2 of the input image, and performs the verification using only the frames F3 and F4. Alternatively, the verification apparatus 100 may also use the frames F1 and F2 for the verification instead of discarding the frames F1 and F2, and more strictly set, or initially set, a verification reference for the frames F1 and F2 than for frames F3 and F4.

The verification apparatus 100 previously sets a valid condition indicating whether, or the extents of whether, a predetermined frame of the input image or a sample frame is in a state appropriate for registration and/or the verification. In the above example, an example valid condition defines the extents of sizes of facial regions, e.g., minimum and/or maximum acceptable extents, while another example valid condition defines the extents of illumination, e.g., minimum and/or maximum acceptable illuminations. When state scores of the frames F1 and F2 do not satisfy the valid condition, and when state scores of the F3 and F4 satisfy the valid condition, the verification apparatus 100 discards the frames F1 and F2 and performs the verification using the frames F3 and F4. When the state scores of the frames F1 and F2 are lower than the state scores of the frames F3 and F4, while the state scores of the frames F1 and F2 still satisfy the valid condition, the verification apparatus 100 may still use the frames F1 and F2 for the verification, but more strictly set a verification reference for the frames F1 and F2 than for frames F3 and F4. In another example regarding the valid condition, and corresponding defining extents of the same, further to the example where F1 and F2 are still used for registration and/or verification, there may be plural tiers of extents for determining whether frames, while failing to meet a first tier of extents, is still within a greater or lesser extents of a second tier of extents, and thus frames F1 and F2 may fall outside of the first tier of extents but still within the second tier of extents and accordingly still used for the registration and/or verification but with the stricter verification reference.

As noted above, the verification reference may include, or may be implemented by, a verification threshold, and like the verification reference, the verification threshold may be dynamically set or adjusted. The verification threshold may be, for example, a minimum or default similarity threshold required for an image of a user to be determined as valid. As a difference between a feature of the verification image and a feature of the registration image decreases, or a distance between the feature of the verification image and the feature of the registration image decreases, a similarity between the feature of the verification image and the feature of the registration image may increase. When the similarity between one or more features of the verification image and one or more features of the registration image is greater than the verification threshold, the verification associated with the corresponding frame is processed as a success, i.e., a successful verification that the verification image matches one or more registration images.

The verification apparatus 100 may dynamically set or adjust the verification threshold to improve a verification performance. The verification threshold may be set or adjusted for each frame. For example, the verification threshold may be independently adjusted and set for each of two or more frames. The adjustment may be from a default verification threshold, for example, or from another set verification threshold for the frame or determined similar frames. In the example of FIG. 1 where the frames F1 and F2 are also used for the verification, the verification apparatus 100 sets the verification threshold, or respective verification thresholds, for the frames F1 and F2 to be higher than a verification threshold, or respective verification thresholds, for the frames F3 and F4. The verification apparatus 100 may dynamically adjust the verification threshold based on at least one of an analysis result of each of the frames included in the verification image or a state score to which the analysis result of each of the frames is applied. By more strictly setting the verification reference for the frames F1 and F2 than for frames F3 and F4, the verification apparatus 100 prevents degradation in verification performance due to the frames F1 and F2 even when the frames F1 and F2 are in a typically less than desirable state or a state otherwise typically inappropriate for the verification.

Also, the verification apparatus 100 may also adjust a liveness threshold, used to determine whether a predetermined frame represents a live image or not-fake image, based on an analysis result of the frame. In response to the liveness threshold being adjusted, verification attempts using fake images may be avoided because frames that fail to meet the liveness threshold can be excluded from the verification process, and thus, the verification performance of the verification apparatus 100 is improved. Adjustments of the verification threshold and the liveness threshold may be performed simultaneously, or an adjustment of one of the verification threshold and the liveness threshold may be performed. The adjustment of the liveness threshold will also be described in detail later.

Figure 2:
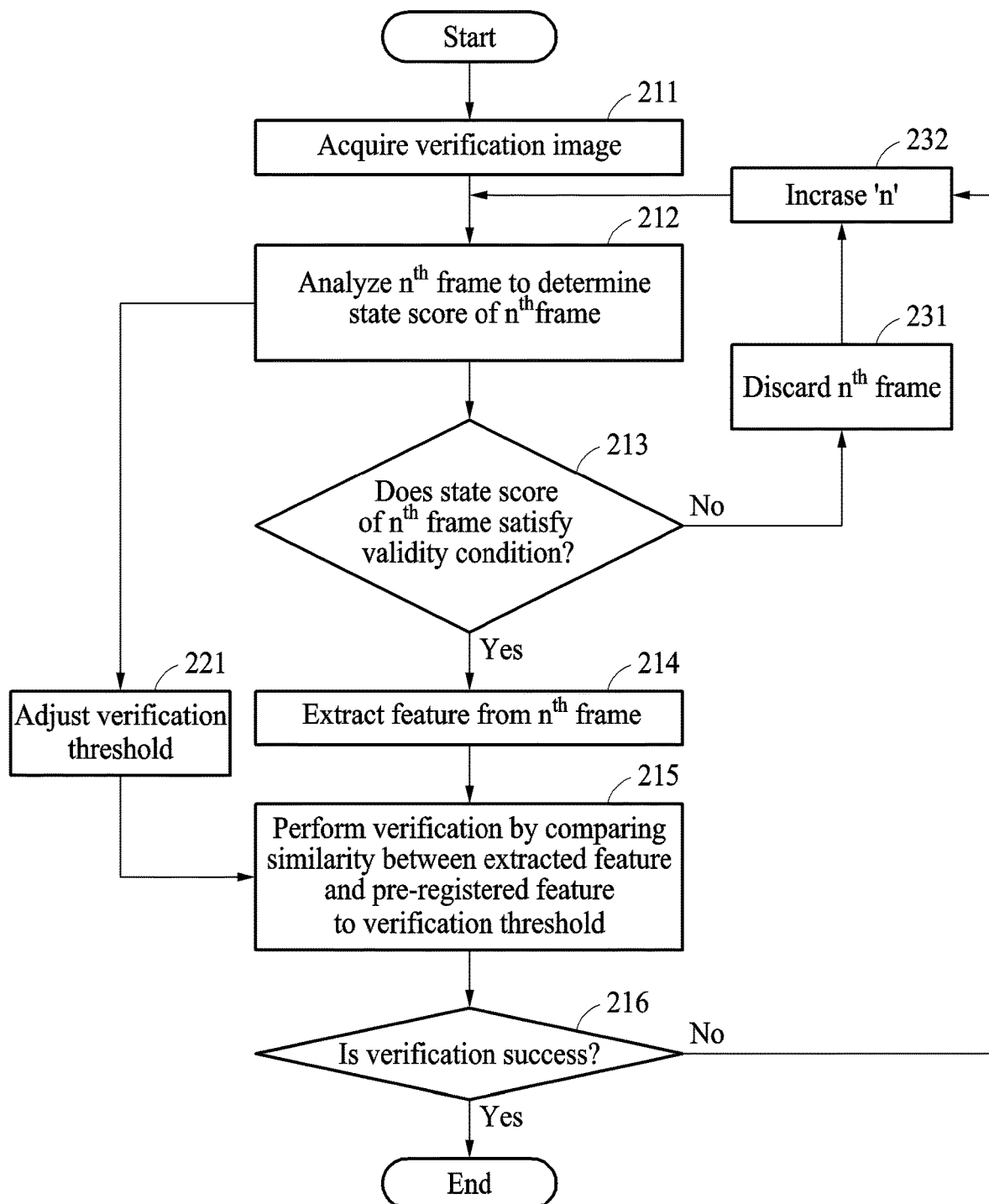
FIG. 2 is a flowchart illustrating an example of a verification process.

FIG. 2 is a flowchart illustrating an example of a verification process. The verification processes of FIG. 2 may be implemented by any or all of the verification apparatuses of FIGS. 1, 7, 10A, and 10B, though embodiments are not limited thereto.

Referring to FIG. 2, in operation 211, a verification apparatus acquires a verification image. The verification image may be acquired by a camera or image sensor of a user terminal, e.g., where the verification apparatus is representative of the user terminal or the user terminal (or camera/image sensor) is separate from the verification apparatus. The verification image includes a plurality of frames. Accordingly, in the following description it will be assumed that an $n^{th}$ frame corresponding to a current frame among the plurality of frames included in the verification image is processed, e.g., with the first through $(n-1)^{th}$ frame having already been processed in a non-limiting example where the processing is sequentially performed.

In operation 212, the verification apparatus analyzes the $n^{th}$ frame to determine a state score of the $n^{th}$ frame. An analysis result of the $n^{th}$ frame includes respective information correspondingly about at least one of a face region size, a degree of eyelid closure, a liveness of the frame, an elapsed time from a camera operation start, an image brightness, a degree of facial occlusion, or a facial expression, as only examples. For example, the verification apparatus analyzes the $n^{th}$ frame to determine whether a brightness of the $n^{th}$ frame is appropriate based on a corresponding valid condition, a face appearing in the $n^{th}$ frame is occluded or includes an occlusion, and which type of facial expression is displayed in the $n^{th}$ frame. A process of analyzing the face region size, the degree of eyelid closure, and the liveness will be described in greater detail further below.

The verification apparatus analyzes the $n^{th}$ frame, compares the analysis result to respective predetermined reference values, and determines a corresponding state score of the $n^{th}$ frame. An example reference value may be determined based on, for example, a first determined acceptable range associated with the face region size, a second determined acceptable range associated with the degree of eyelid closure, and a third determined acceptable range associated with the image brightness. The verification apparatus correspondingly compares the analysis result of the $n^{th}$ frame to each of the first acceptable range, the second acceptable range, and the third acceptable range to determine the state score of the $n^{th}$ frame. For example, when the analysis result indicates that the face region size in the frame is within the first acceptable range, that the degree of eyelid closure is within the second acceptable range, and the image brightness is within the third acceptable range, the state score of the $n^{th}$ frame may be determined to be relatively high or may have a relatively high value.

As further described below, when the eyelid closure is detected in the $n^{th}$ frame, an eye blink or a sleep state may be determined as a factor affecting the eyelid closure. The factor affecting the eyelid closure is determined based on whether the eyelid closure occurs continuously. When the eyelid closure is detected from the $n^{th}$ frame, and a sleep state is determined as the factor affecting the eyelid closure, the verification apparatus performs operation 231 instead of determining the state score of the $n^{th}$ frame. As an example, the sleep state may be determined if the eyelid closure has been detected in a sequence of immediately previous frames or based on other determinations.

In operation 221, the verification apparatus adjusts the verification threshold for the $n^{th}$ frame. The verification threshold may be adjusted for each frame of the verification image. As an alternative, the verification threshold may be adjusted, or operation 221 only performed, for only those frames that are not excluded in operation 231, e.g., for frames that satisfy the example validity conditions of operation 213 discussed further below. In operation 221, the verification apparatus adjusts the verification threshold for the $n^{th}$ frame based on at least one of the analysis result of the $n^{th}$ frame and the state store of the $n^{th}$ frame. For example, the verification threshold may be adjusted such that a verification difficulty increases as the state score of the $n^{th}$ frame decreases. A high verification difficulty indicates that the verification is not to be easily succeeded. For example, to increase the verification difficulty, the verification threshold is set to be relatively high.

In an example, the verification threshold may additionally or alternatively be determined based on an analysis result of a registration image that is previously stored in a user registration process. As further discussed below, the verification apparatus may store the analysis result of the registration image during the user registration process. For example, during the registration process, the verification apparatus may store a feature extracted from an $m^{th}$ frame of the registration image and an analysis result of the $m^{th}$ frame while determining that the $m^{th}$ frame is to be registered. In this example, in determining the verification threshold, the verification apparatus compares the analysis result of the $n^{th}$ frame to the analysis result of the $m^{th}$ frame and adjusts the verification threshold for the $n^{th}$ frame to be increased or reduced, such as from a default verification threshold, or merely sets the verification to a corresponding high threshold value or a lesser high threshold value.

Here, the verification threshold may be adjusted to reduce FAR as discussed above. For example, the verification threshold for the $n^{th}$ frame may be adjusted such that the verification difficulty increases according to an increase in a difference between the analysis result of the $n^{th}$ frame of the verification image and the analysis result of the $m^{th}$ frame of the registration image. When the difference between the analysis result of the $n^{th}$ frame and the analysis result of the $m^{th}$ frame is relatively small, the verification threshold for the $n^{th}$ frame is adjusted such that the verification difficulty is reduced or the verification threshold may merely be maintained at a current or default value. The foregoing example is based on a case in which a verification accuracy increases when a verification-image-captured situation is similar to a registration-image-captured situation.

Also, the verification threshold may alternatively, or also, be adjusted to reduce a false rejection ratio (FRR). In terms of unlocking a lock mode of a terminal, for example, where primarily only the valid user attempts to be verified in general, and thus, a relatively high security level, e.g., corresponding to, for example, a mobile payment, may not be required. Thus, when the face verification is performed in an application requiring a relatively low security level to unlock the lock mode, the verification threshold is adjusted to be reduced depending on examples, while when high security level is preferred, such as in the mobile payment example, the verification threshold may be set or maintained at a higher value or increased to a higher value.

As another example, it may be assumed that a valid user wearing glasses may register all registration images while wearing glasses, but the valid user may also attempt to be verified without glasses. In this example, even though the valid user attempts to be verified, a false rejection may occur in response to the verification threshold being set to be too relatively high, which may lead to an inconvenience of the user. Thus, in such an example, when the verification image is captured in a situation different from situations included in the analysis result of the registration image, the verification threshold may be maintained or adjusted to be reduced. Accordingly, when a verification request is received from a predetermined application for, for example, an application for unlocking the lock mode of a terminal, and when a difference between the analysis result of the $n^{th}$ frame of the verification image and the analysis result of the $m^{th}$ frame of the registration image is determined to be relatively large, the verification apparatus may maintain the verification threshold for the $n^{th}$ frame or adjusts a verification difficulty to be reduced and may ultimately perform the verification process with the $n^{th}$ frame.

In operation 213, the verification apparatus determines whether the state score of the $n^{th}$ frame satisfies a validity condition. For example, the valid condition includes a predetermined threshold. When the state score of the $n^{th}$ frame is greater than or equal to the threshold, it is determined that the valid condition is satisfied. When the state score of the $n^{th}$ frame is less than the threshold, it is determined that the valid condition is not satisfied. The valid condition may include a condition associated with the factor affecting the eyelid closure, for example. When the eyelid closure is detected from the $n^{th}$ frame, and when the sleep state is determined as the factor affecting the eyelid closure, the verification apparatus determined that the $n^{th}$ frame does not satisfy the valid condition.

When the state score of the $n^{th}$ frame satisfies the valid condition, operation 214 is performed. When the state score of the $n^{th}$ frame does not satisfy the valid condition, operation 231 is performed.

In operation 231, the verification apparatus discards the $n^{th}$ frame. Discarding the $n^{th}$ frame indicates or results in searching for an $(n+1)^{th}$ frame instead of using the $n^{th}$ frame in the verification process of operation 215, for example. In operation 232, the verification apparatus increases n, and operations 212 and 213 are then performed on the $(n+1)^{th}$ frame.

In operation 214, the verification apparatus extracts one or more features from the $n^{th}$ frame. In operation 215, the verification apparatus performs verification by comparing a similarity between the one or more features extracted from the $n^{th}$ frame and one or more pre-registered features according to the set or adjusted verification threshold. A pre-registered feature is, for example, a feature extracted from the registration image through the user registration process of the verification apparatus. Also, with the verification being performed on the $n^{th}$ frame, the verification in operation 215 is performed using the verification threshold set or adjusted for the $n^{th}$ frame in operation 221. For example, in operation 221, when the $n^{th}$ frame is in a state that determined to be less appropriate for the verification, or when the determined state score of the $n^{th}$ frame is relatively low, the verification threshold for the $n^{th}$ frame is set to be relatively high. In this example, the verification difficulty using the $n^{th}$ frame increases. As another example, the frame in a state determined inappropriate for the verification is discarded, while if the frame is merely determined less appropriate for the verification or the determined state score is relatively low but above a minimum threshold, the verification difficulty with respect to the corresponding frame may be set to be relatively high and the frame still used in the verification operation 215.

In operation 216, the verification apparatus determines whether the verification is a success. When a determined similarity between the one or more pre-registered features and the one or more features extracted from the $n^{th}$ frame is greater than or equal to the verification threshold, the verification apparatus determines that the verification associated with the $n^{th}$ frame has succeeded. When the verification has succeeded, the verification apparatus outputs a verification result or indictor including information indicating that the verification has succeeded and terminates the verification process. When a determined similarity between the feature extracted from the $n^{th}$ frame and the pre-registered feature is less than the verification threshold, the verification apparatus determines that the verification associated with the $n^{th}$ frame has failed. When the verification has failed, the verification apparatus increases a value of n in operation 232, and then performs operation 212 again with respect to a next frame. Alternatively, such as when there are no further frames available or even when additional frames are still available, when the verification has failed, the verification apparatus may output a verification result including information indicating the verification has failed, and then terminate the verification process. When the verification has failed, whether to terminate the verification process or continuously perform the verification process using a subsequent frame may be determined based on a preset policy.

Figure 3:
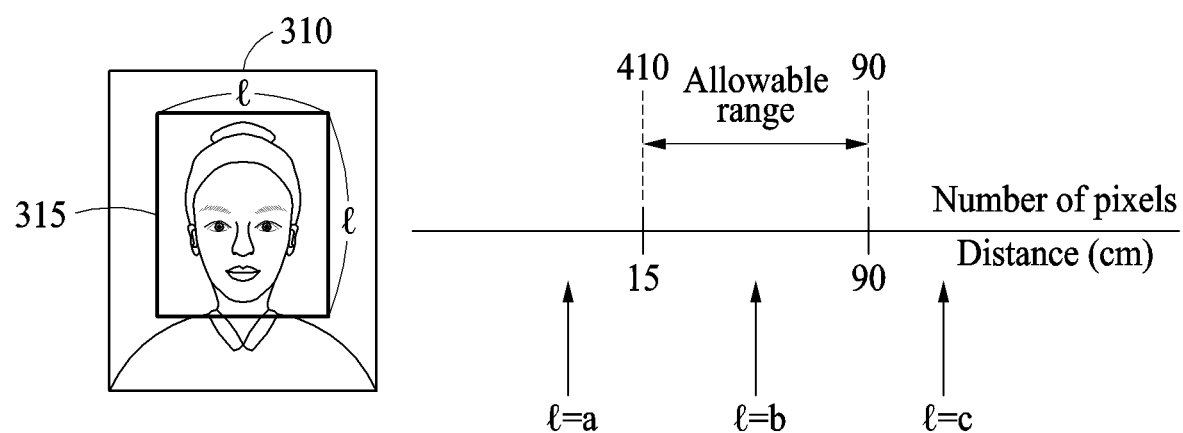
FIG. 3 is a diagram illustrating an example of a process of analyzing a face region.

FIG. 3 is a diagram illustrating an example of a process of analyzing a face region. The processes of FIG. 3 may be implemented by any or all of the verification apparatuses of FIGS. 1, 7, 10A, and 10B, though embodiments are not limited thereto. In addition, the description of FIG. 3 is applicable to both analysis processes of a verification image and/or a registration image, and thus may be implemented in both the verification process, such as with respect to verification images, and in the registration process, such as with respect to registration images.

Referring to FIG. 3, FIG. 3 illustrates a frame 310 of an input image, where the verification apparatus detects a face region 315 from the frame 310 and determines a size of the face region 315 to determine whether the frame 310 is in a state appropriate for verification. The size of the face region 315 is determined based on a size parameter l. For example, the size parameter l may represent or indicate the dimensions or number of pixels making up each side of the face region 315.

An acceptable range may be predetermined with respect to the face region 315 in advance. For example, a depth range between 15 centimeters (cm) and 90 cm may be predetermined as the acceptable range, where 15 cm and 90 cm represent a distance between a user and a user terminal or the camera or image sensor that captured the image 310. In this example, the user may be inferred to be 15 cm from the user terminal when the face region 315 has a lateral dimension of 410 pixels, while the user may be inferred to be 90 cm from the user terminal when the face region 315 has a lateral dimension of 90 pixels.

Accordingly, the verification apparatus may compare the size of the face region 315 to a predetermined acceptable range to determine the state score of the frame 310. In the illustrated example of FIG. 3, when the determined size parameter l falls within a range a or range c, e.g., respectively greater than 410 pixels or less than 90 pixels, the size of the face region 315 may be beyond the acceptable range and less appropriate or not appropriate for verification. For example, when the size parameter l falls within the range a, the verification apparatus may thus determine that the captured user face is excessively large beyond the acceptable range, and when the size parameter l falls within the range c, the verification apparatus may thus determine that the captured user face is excessively small beyond the acceptable range.

When the size parameter l is within the range of b, e.g., between the example 410 pixels and 90 pixels, the size of the face region 315 may be within the acceptable range. Thus, the verification apparatus may assign a high state score to the frame 310 when the size parameter l within the range b, and may accordingly assign a low state score to the frame 310 when the size parameter l is within the ranges a or c.

The verification apparatus adjusts the verification threshold for the frame 310 based on at least one of an analysis result of the face region 315 and the state score of the frame 310. For example, when the size parameter l is within range b, the verification apparatus may adjust the verification threshold for the frame 310 to be reduced or may maintain a current or default value. Also, when the size parameter l is within either of the ranges a or c, the verification apparatus may adjust the verification threshold for the frame 310 to be increased.

Figure 4:
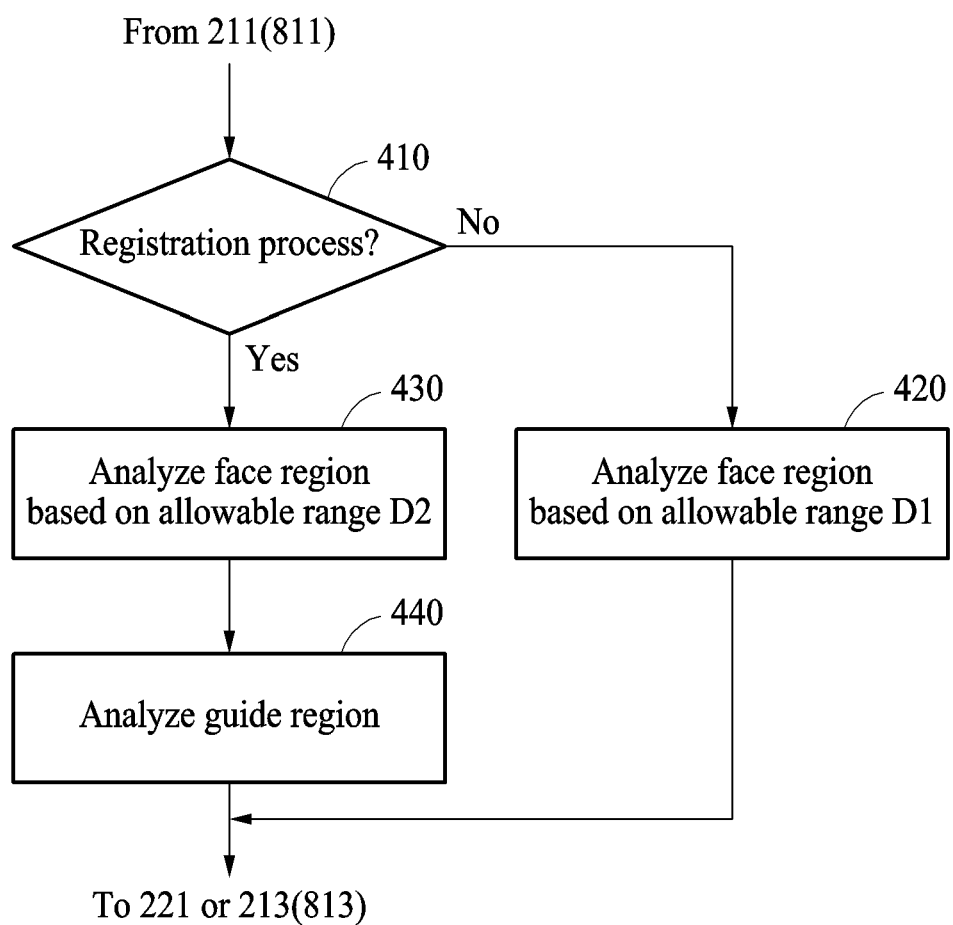
FIG. 4 is a flowchart illustrating an example of a process of analyzing a face region in each of a registration process and a verification process.

FIG. 4 is a flowchart illustrating an example of a process of analyzing a face region in each of a registration process and a verification process. The processes of FIG. 4 may be implemented by any or all of the verification apparatuses of FIGS. 1, 7, 10A, and 10B, though embodiments are not limited thereto. In addition, the description of FIG. 4 is applicable to both processes of a verification image and/or a registration image, and thus may be implemented in both the verification process, such as with respect to verification images, and in the registration process, such as with respect to registration images.

Further to the above discussion regarding FIG. 3, different acceptable ranges may exist or be set for analyzing a face region in a registration process than in a verification process. Once a registration image is registered, the registration image may be continually or repeatedly used in all or most all subsequent verification processes. Thus, a more strict reference for face region acceptability may be desired for the registration process in comparison to the verification process so as to improve a verification performance. For example, a narrower acceptable range for the above example of FIG. 3 may be set for the registration process in comparison to the verification process. Also, additional analyses may be performed in the registration process in addition to the face region size analyses.

Referring to FIG. 4, in operation 410, a verification apparatus may determine whether a current process is a registration process. When a current process is the registration process, operation 430 is performed. When the current process is the verification process, operation 420 is performed. Operation 410 may be performed after operation 211 of FIG. 2 and/or and may be performed after operation 811 of FIG. 8.

In operation 420, the verification apparatus analyzes a face region of a current frame based on an acceptable range D1. In operation 430, the verification apparatus analyzes the face region of the current frame based on an acceptable range D2. In operations 420 and 430, the verification apparatus performs the operation described with reference to FIG. 3. The acceptable range D2 is set to be narrower, for example, than the acceptable range D1. For example, if the acceptable range D1 is set to the example range b of FIG. 3, between 15 cm and 90 cm, the acceptable range D2 may be set to another range between 20 cm and 50 cm.

In operation 440, the verification apparatus may further analyze a guide region of the current frame. In the registration process, for example, a guide region indicating an appropriate position of a face may be displayed on a screen of the user terminal as the verification apparatus. A user may observe the guide region and physically adjust a distance between the user and the user terminal until that the guide region is filled with the user's face. In this example, the verification apparatus may calculate an aligned state indicating to what degree portions of the face region are included in the guide region, or what portion of the face region is included in the guide region, and may determine a state score of a current frame based on the calculated aligned state. For example, when the degree or portion of the face region included in the guide region is less than a predetermined threshold, the verification apparatus may determine that the aligned state of the current frame is inappropriate and thus, may assign a low state score to the current frame.

Figure 8:
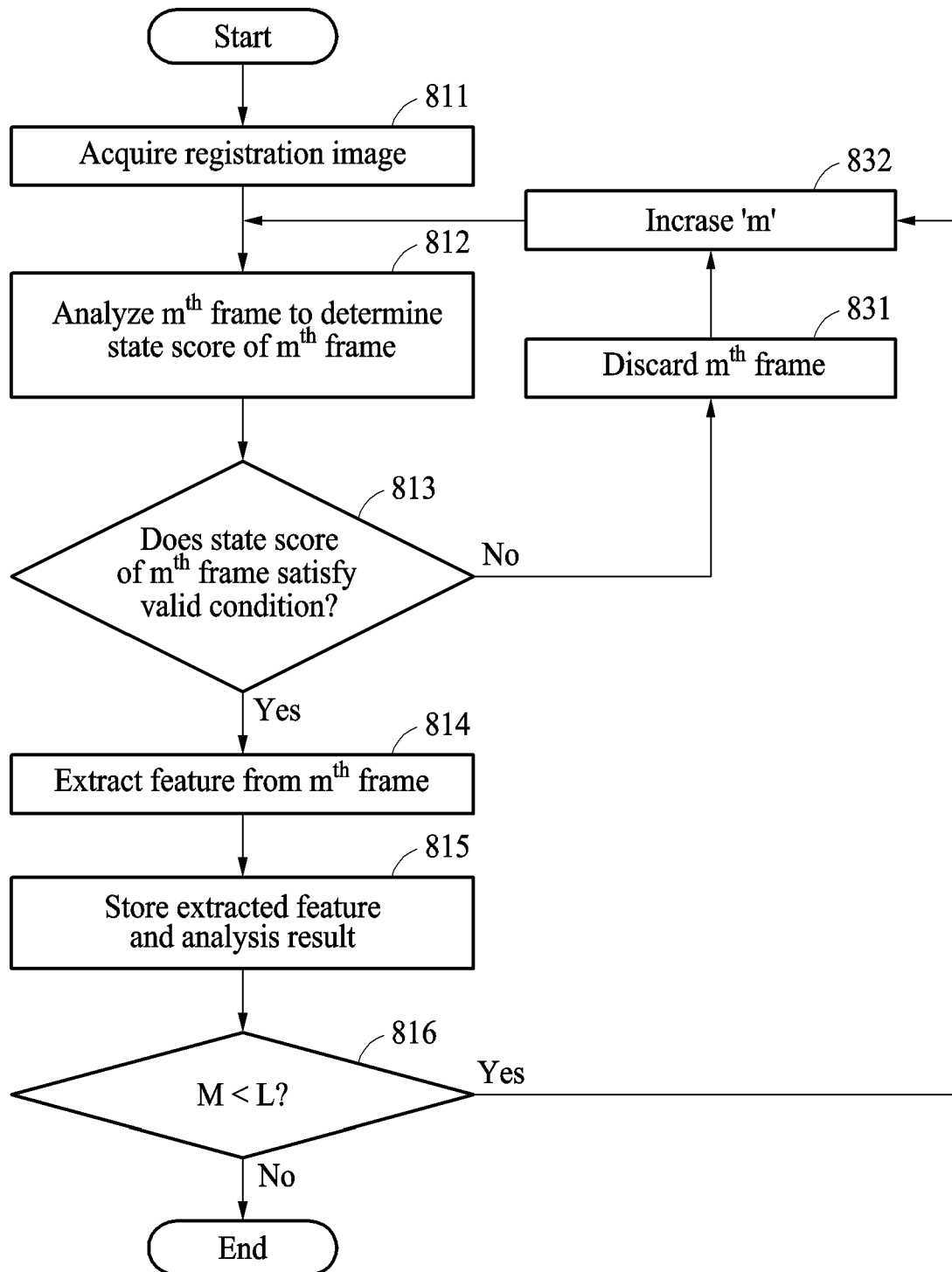
FIG. 8 is a flowchart illustrating an example of a registration process.
Figure 10:
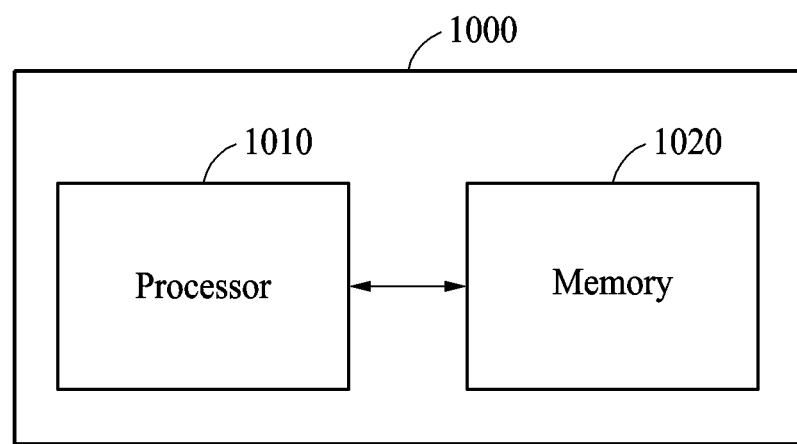
FIGS. 10A-10B are block diagrams illustrating examples of a verification apparatus.
Figure 10:
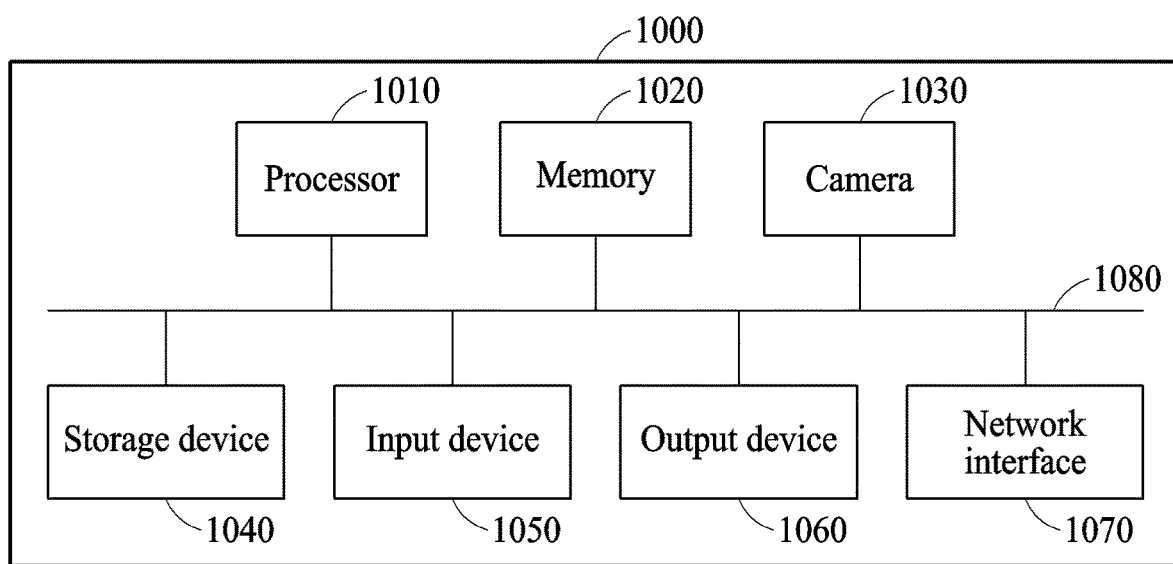

After operation 420, operation 221 and/or 213 of FIG. 2 may be performed, and after operation 440, operation 813 of FIG. 8 may be performed.

Figure 5:
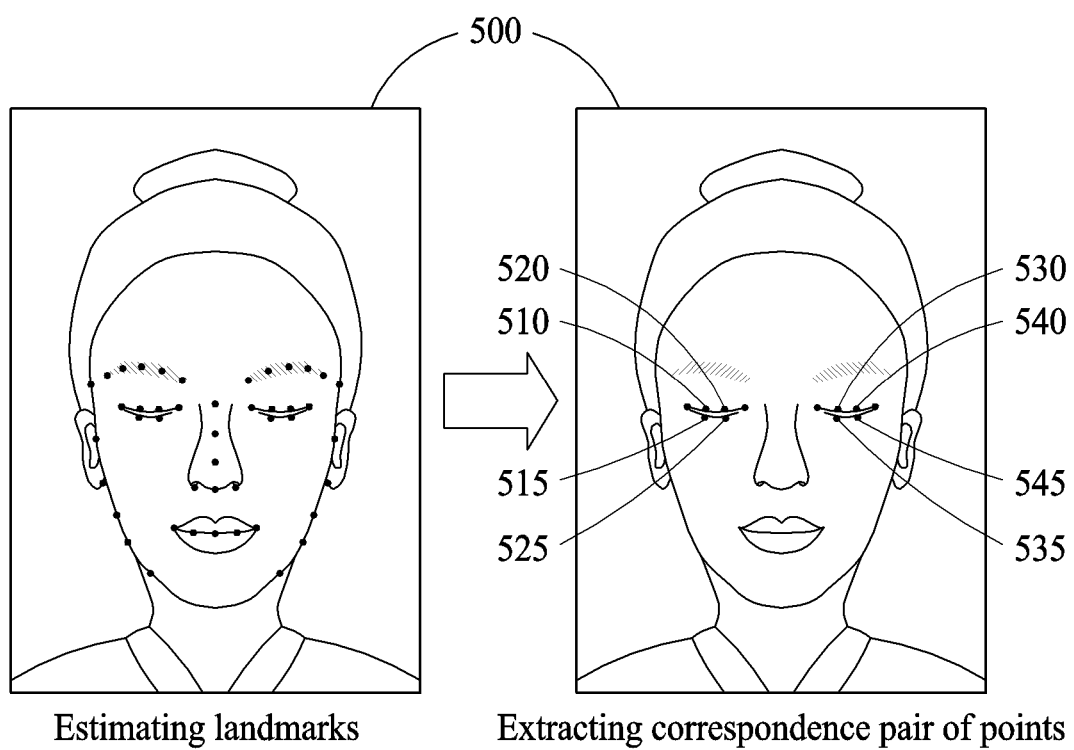
FIG. 5 is a diagram illustrating an example of a process of analyzing a degree of an eyelid closure.

FIG. 5 is a diagram illustrating an example of a process of analyzing a degree of an eyelid closure. The processes of FIG. 5 may be implemented by any or all of the verification apparatuses of FIGS. 1, 7, 10A, and 10B, though embodiments are not limited thereto. In addition, the description of FIG. 5 is applicable to both processes of a verification image and/or a registration image, and thus may be implemented in both the verification process, such as with respect to verification images, and in the registration process, such as with respect to registration images.

FIG. 5 illustrates a frame 500 of an input image, and to determine whether the frame 500 is in a state appropriate for verification, the verification apparatus estimates landmarks corresponding to feature elements of a face in the frame 500, and extracts correspondence points located in an upper portion and a lower portion of an eye from the estimated landmarks. For example, the verification apparatus extracts landmarks 510 and 515, landmarks 520 and 525, landmarks 530 and 535, and landmarks 540 and 545 as the respective correspondence pairs.

The verification apparatus determines a degree of eyelid closure based on the extracted correspondence pairs of points. The verification apparatus determines the degree of eyelid closure based on, for example, a distance between the landmarks 510 and 515, a distance between the landmarks 520 and 525, a distance between the landmarks 530 and 535, and a distance between the landmarks 540 and 545. As a distance between two landmarks included in the correspondence pair decreases, the degree of eyelid closure is determined to be a greater value. As the degree of eyelid closure increases, the verification apparatus assigns a lower state score to the frame 500, and adjusts a verification threshold for the frame 500 to be increased.

The verification apparatus scores an analysis result of each frame for each item of analysis in the verification process. For example, the verification apparatus stores a degree of eyelid closure of an $(n-1)^{th}$ frame as an analysis result of the $(n-1)^{th}$ frame, stores a degree of eyelid closure of an $n^{th}$ frame as an analysis result of the $n^{th}$ frame, and stores a degree of eyelid closure of an $(n+1)^{th}$ frame as an analysis result of the $(n+1)^{th}$ frame. The verification apparatus analyzes a degree of eyelid closure with respect to consecutive frames in the verification image to determine a factor affecting the eyelid closure. The factor affecting the eyelid closure is determined as one of an eye blink and a sleep state, for example.

When the degree of eye closure exceeding a predetermined threshold is detected from the consecutive frames, the verification apparatus determines the factor affecting the eyelid closure is the sleep state. In a case of an eye closure due to the eye blink, a verification difficulty is increased to improve or maintain a verification performance. In a case of the eye closure due to the sleep state, the verification apparatus may block a verification attempt with the correspondingly determined frame. Thus, when the eye closure is detected from a predetermined frame based on an analysis result of the frame, and when it is determined that a factor affecting the eye closure is the sleep state, the verification apparatus may discard the frame and perform the verification process using a subsequent frame.

In an example, when an eye-closed state is detected from the current frame, the verification apparatus may be further configured to output a message on the screen of the user terminal to induce the user to open the user's eyes. For example, the verification apparatus outputs a message "open your eyes" on the screen of the user terminal. When the eye-closed state is maintained, and when it is determined that the factor affecting the eyelid closure is the sleep state, the verification apparatus may display a message on the screen that includes contents associated with the sleep state. For example, the verification apparatus outputs a message "sleep state is detected and verification has failed" on the screen of the user terminal.

Figure 6:
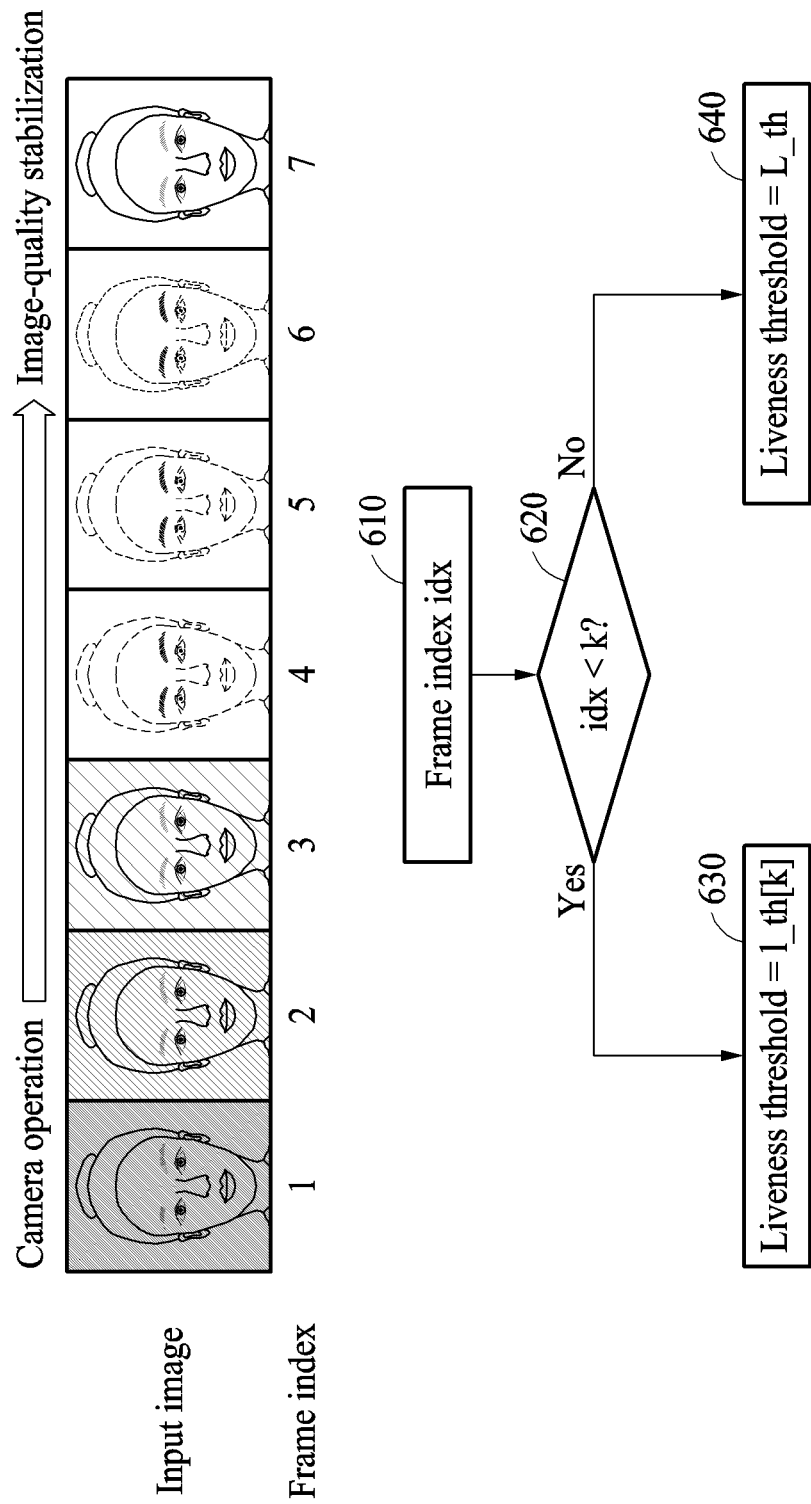
FIG. 6 is a diagram illustrating an example of adjusting a liveness threshold based on a camera operation.

FIG. 6 is a diagram illustrating an example of adjusting a liveness threshold based on a camera operation. The liveness threshold adjustment of FIG. 6 may be implemented by any or all of the verification apparatuses of FIGS. 1, 7, 10A, and 10B, though embodiments are not limited thereto. In addition, the description of FIG. 6 is applicable to both liveness threshold adjustments for a verification image and/or a registration image, and thus may be implemented in both the verification process, such as with respect to verification images, and in the registration process, such as with respect to registration images.

The verification apparatus considers the liveness of an input image to prevent implementation or success of a user registration or verification using a fake image that merely reproduces the face of a valid user instead of relying on an actual live face of a user. The liveness of the input image may be determined based on a liveness parameter that is determined for each frame of the input image. The liveness parameter respectively indicates the likelihood of whether each frame is based on an image acquired by effectively capturing an actual user or capturing a reproduction of the user.

The verification apparatus determines a liveness score of an $n^{th}$ frame based on a liveness test of the $n^{th}$ frame. For example, as a likelihood of the $n^{th}$ frame including the actual user increases, a higher liveness score is determined. To prevent misidentification of the liveness in a predetermined frame of the face image, the liveness score of the current frame may also be determined based on at least one previous frame. For example, the liveness score of the $n^{th}$ frame may be determined based on a liveness score that is acquired based on a liveness test of the $n^{th}$ frame and a cumulative liveness score determined with respect to one or more previous frames.

The verification apparatus compares the liveness score determined with respect to the $n^{th}$ frame to a liveness threshold for the $n^{th}$ frame to determine the liveness parameter for the $n^{th}$ frame. When the liveness score of the $n^{th}$ frame is greater than or equal to the liveness threshold of the $n^{th}$ frame, it is determined that the $n^{th}$ frame is more or most likely a live image based on the liveness parameter of the $n^{th}$ frame. The liveness threshold of the $n^{th}$ frame may be adjusted based on the analysis result of the $n^{th}$ frame. For example, when a face region size of the $n^{th}$ frame is beyond an acceptable range, such as beyond the example range b of FIG. 3, the liveness threshold of the $n^{th}$ frame may be set to have a relatively high value.

Still further, FIG. 6 illustrates frames in a process of stabilizing an image quality after a camera starts to operate. When a camera operation starts, a predetermined period of time may be required until an exposure, a focus, and a white balance are automatically set, e.g., until such automated exposure adjustment, focusing, and white balancing processes have fully completed. To achieve a high verification accuracy, an image captured at an appropriate exposure may be desired. However, as illustrated in FIG. 6, at the beginning of the camera operation, frames may be captured at an excessively high or low brightness until image quality has stabilized. The verification apparatus sets the liveness threshold to be relatively high until the image quality has stabilized after the start of the camera operation so as to more strictly determine whether the liveness is present than after image quality has stabilized. Hereinafter, a process of adjusting a liveness threshold for frames illustrated FIG. 6 will be described in greater detail.

In operation 610, the verification apparatus verifies an index idx of a current frame, e.g., in a series of captured image frames during the camera operation toward the stabilized image quality. In operation 620, the verification apparatus compares the index idx to an index k corresponding to a point in time at which an image quality is stabilized. The point in time at which the image quality is stabilized may be previously determined. For example, image quality stabilization may typically occur within a set number of frame captures. Also, the verification apparatus may determine the point in time at which the image quality has stabilized by analyzing the input image. When the index idx is less than the index k, operation 630 is performed. When the index idx is greater than or equal to the index k, operation 640 is performed.

In operation 630, the verification apparatus determines a liveness threshold from a vector I_th to be a value corresponding to the index idx. The vector I_th is, for example, [0.95f 0.95f 0.95f 0.90f 0.85f 0.65f 0.50f], f being a reference value determined for the liveness threshold. In this example, a liveness threshold that is associated with a frame having the index idx corresponding to 1 is determined to be 0.95f, and a liveness threshold that is associated with a frame having the index idx corresponding to 4 is determined to be 0.90f. The vector I_th may be previously determined or determined dynamically based on an image quality analysis result of the input image.

In operation 640, the verification apparatus determines the liveness threshold as a stabilization value L_th determined in advance. The stabilization value L_th is, for example, 0.50f. Thus, the liveness threshold may be gradually reduced from a predetermined first value to a predetermined second value after a camera capturing a verification image starts to operate.

The verification apparatus determines a state score of an $n^{th}$ frame based on a liveness parameter. In response to a determination that the $n^{th}$ frame has a greater probability or is more or most likely to be a live image, a high state score is assigned to the $n^{th}$ frame. Rather, in response to a determination that the liveness is absent, i.e., the $n^{th}$ frame has lower probability or is more likely not a live image, a low state score is assigned to the $n^{th}$ frame.

Figure 7:
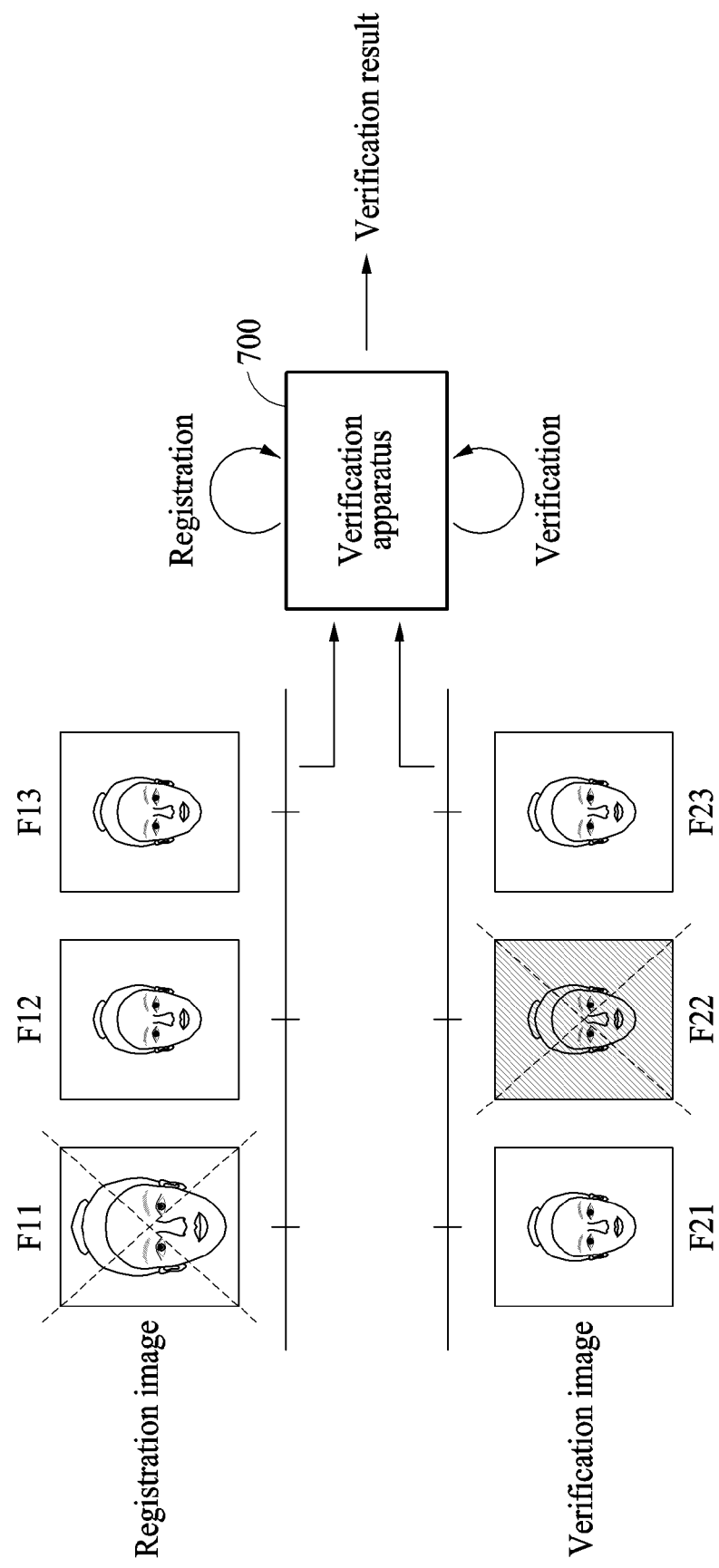
FIG. 7 is a diagram illustrating an example of a verification apparatus for performing verification using a verification image and registration using a registration image.

FIG. 7 is a diagram illustrating an example of a verification apparatus for performing verification using a verification image and for performing registration using a registration image. A verification apparatus 700 performs a registration process based on the registration image and performs a verification process based on a verification image. The verification apparatus 700 performs face verification in the verification process and outputs a verification result.

The verification apparatus 700 performs the registration process by selecting a frame determined appropriate for registration from a plurality of frames included in the registration image. For example, a size of a face region in a frame F11 is greater than a predetermined acceptable value. Thus, the frame F11 may be determined to be in a state inappropriate for the registration. In this example, the verification apparatus 700 analyzes frames F11, F12, and F13, discards the frame F11 of the registration image, and performs the registration using only the frames F12 and F13.

In this example, the verification apparatus 700 may previously sets a value condition for indicating whether a predetermined frame in the registration image is in a state available or appropriate for the registration. When a state of the frame F11 does not satisfy the valid condition, and when state scores of the F12 and F13 satisfy the valid condition, the verification apparatus 700 discards the frame F11 and registers features extracted from the frames F12 and F13.

The verification apparatus 700 performs the verification process by selecting a frame determined appropriate for verification from a plurality of frames included in the verification image, and/or dynamically adjusts a verification difficulty for each frame based on a verification threshold. For example, the verification apparatus 700 may discard a frame F22, and only compare features extracted from frames F21 and F23 to the features extracted from the frames F12 and F13, and perform the verification process. Alternatively, the verification apparatus 700 maintains the frame F22 for the verification instead of discarding the frame F22 while strictly setting a verification reference for the frame F22 compared to the respective verification references applied for F21 and F23. In this example, the verification apparatus 700 further compares a feature extracted from the frame F22 to the features extracted from the frames F12 and F13, and performs the verification with the verification threshold set to be relatively high for frame F22 compared to the respective verification thresholds applied for frames F21 and F23.

FIG. 8 is a flowchart illustrating an example of a registration process. The registration process of FIG. 8 may be implemented by any or all of the verification apparatuses of FIGS. 1, 7, 10A, and 10B, though embodiments are not limited thereto.

Referring to FIG. 8, in operation 811, a verification apparatus acquires a registration image. The registration image may be acquired by a camera or image sensor of a user terminal, e.g., where the verification apparatus is representative of the user terminal or the user terminal (or camera/image sensor) is separate from the verification apparatus. The registration image includes a plurality of frames. Accordingly, in the following description it will be assumed that an $m^{th}$ frame corresponding to a current frame among the plurality of frames included in the registration image is processed, e.g., with the first through $(m-1)^{th}$ frame having already been processed in a non-limiting example where the processing is sequentially performed.

In operation 812, the verification apparatus analyzes the $m^{th}$ frame to determine a state score of the $m^{th}$ frame. An analysis result of the $m^{th}$ frame includes respective information correspondingly about at least one of a face region size, a degree of eyelid closure, a liveness of the frame, an elapsed time from a camera operation start, an image brightness, a degree of facial occlusion, or a facial expression, as only examples. The foregoing descriptions about analyses of the verification image in FIGS. 1-7 are also applicable to, and such operations may also be implemented in, analyses of the registration image in operations of FIG. 8.

For example, in operation 813, the verification apparatus determines whether the state score of the $m^{th}$ frame satisfies a predetermined valid condition. When the state score of the $m^{th}$ frame satisfies the valid condition, operation 814 is performed. When the state score of the $m^{th}$ frame does not satisfy the valid condition, operation 831 is performed.

Likewise, in operation 831, the verification apparatus discards the $m^{th}$ frame, and in operation 832, the verification apparatus increases m. Thus, when the state score of the $m^{th}$ frame does not satisfy the valid condition, and m is increased, operations 812 and 813 are then performed on the $(m+1)^{th}$ frame.

In operation 814, the verification apparatus extracts one or more features from the $m^{th}$ frame. In operation 815, the verification apparatus stores the one or more features extracted from the $m^{th}$ frame and an analysis result of the $m^{th}$ frame. The one or more features extracted from the $m^{th}$ frame may be compared to one or more features extracted from the verification image in the verification process, for example. In addition, the analysis result of the $m^{th}$ frame may be considered when determining the verification threshold of one or more frames of the verification image. For example, in the verification operation, when it is determined that a difference between a situation in which the $m^{th}$ frame of the registration image was captured and a situation in which an $n^{th}$ frame of the verification image is captured is relatively large, e.g., based on a comparison of the analysis result of the $m^{th}$ frame and the analysis result of the $n^{th}$ frame, a high verification threshold may be determined or set for the $n^{th}$ frame, while when the difference between the situation in which the $m^{th}$ frame of the registration image was captured and the situation in which the $n^{th}$ frame of the verification image is captured is relatively small, a lower or default verification threshold may be determined or set for the $n^{th}$ frame. The foregoing example may be based on a case in which the verification accuracy increases when the registration-image-captured situation is similar to the verification-image-captured situation.

In operation 816, the verification apparatus compares a number M of currently stored registration frames to a target number L of stored registration frames. The target number L may be set in advance of the registration process, for example. As only an example, the target number L may be set such that information on 10 frames will ultimately or desirably be stored during the registration process, or that the registration process may continue until information, e.g., respective situation, score, and/or feature information, about the 10 registration frames have been stored. Thus, when the number M of the currently stored frames is less than the target number L, operation 832 is performed, m is increased and a next frame is considered or another registration image with one or more frames is requested and/or captured and considered in the registration process. When the number M of currently stored frames is greater than or equal to the target number L, the registration process may be terminated.

As noted above, the aforementioned verification process may be performed after the registration process is completed or after information about at least one registration image has been stored, and the description about the verification process is also applicable to the registration process.

FIG. 9 is a diagram illustrating an example of a verification process based on analyses results of one or more registration images and analyses results of one or more verification images. The verification processes of FIG. 9 may be implemented by any or all of the verification apparatuses of FIGS. 1, 7, 10A, and 10B, though embodiments are not limited thereto.

Referring to FIG. 9, frames F31 through F34 are registered frames of a registration image and frames F41 and F42 are frames of a verification image.

The verification apparatus generates a verification result based on the frame F41 by comparing the frame F41 to each of the frames F31 through F34. When at least one of the frames F31 through F34 is determined to be sufficiently alike the frame F41, e.g., with a confidence level that meets a particular verification reference or threshold, the verification apparatus determines that the verification associated with the frame F41 has succeeded.

As discussed above, when low state scores may be assigned to, and stored for, the frames F31, F33, and F34, e.g., due to the occlusions in frames F31 and F33 and facial expression in frame F34, when the verification process is implemented with these registration frames, their lower state scores may suggest a lesser reliability or desirability of frames F31, F33, and F34 being relied upon as registered frames. However, even when the frames F31, F33, and F34 are registered with indications of their lower state scores or respective indications of their lesser reliability or desirability for use in verification processes, e.g., dependent on the situation of the respective registration frames, a verification process that considers frames F31, F33, and F34 may still have a maintained verification performance as the verification process performed with a higher state scored frame F32, which may indicate the greater reliability or desirability of frame F32 as a registration frame for a verification process. As explained above, this verification maintenance may be achieved by instituting greater verification thresholds when the frames F31, F33, and F34 are considered during the verification process.

In addition, verification performance may be maintained by also considering similarity mappings of situations between registration frames and verification frames. For example, it may be determined that the frame F41 has been captured in a similar situation when compared to the stored information about the frame F33, which may include information about the situation of the frame F33. In this example, a verification threshold TH1 for the frame F41 may be set to be relatively high, or adjusted to be increased, for the verification comparison between extracted features of the frame F41 and stored features of the frame F32, while a verification threshold TH2 for the frame F41 may be set to be relatively low (or adjusted to be decreased or maintained), or a default level for the verification comparison between extracted features of the frame F41 and stored features of the frame F33. Thus, with the lower or decreased verification threshold and greater similarities, the verification process for the frame F41 with respect to frame F33 may succeed, while the verification process for the frame F41 with respect to frame F34 may not succeed. Accordingly, when considering similarity situation mappings in the verification process frame F41 may not be mapped to each of the frames F31, F32, and F34, but mapped to frame F33, and thus, setting or adjustment of the verification threshold for frame F41 with respect to frames F31, F32, and F34 may be different than the setting or adjustment of the verification threshold for frame F41 with respect to frame F32. Likewise, frame F42 may be captured in a situation determined appropriate for the verification that can be situation mapped to the frame F32, and any verification threshold setting or adjustment between frame F42 and frame F32 may be different from any verification threshold setting adjustment between frame F42 and frames F31, F33, and F34.

Accordingly, similar to the consideration of the stored situation indicating information about the registration frames in setting or adjusting the verification threshold, the verification threshold may alternatively or additionally be set or adjusted based on determined situation similarities or non-similarities between registration frames and verification frames, and thus, verification in both or either approaches accuracies may be maintained even though registration frames and/or verification frames are used with respective situations that may typically represent lower or higher than desirable illumination, farther or closer than typically desirable face sizes, typically lesser desirable facial expressions, degrees of eye closures, or occlusions, typically lesser desirable other image quality characteristics, or lower than typically desirable liveness confidences, as only examples. Thus, the verification apparatus presents a technological improvement over previous approaches where such registration and/or verification images could not be considered and/or verification accuracies could not be maintained.

FIGS. 10A and 10B are block diagrams illustrating examples of a verification apparatus. Referring to FIG. 10A, a verification apparatus 1000 includes a processor 1010 and a memory 1020. Referring to FIG. 10B, the verification apparatus 1000 includes one or more processors 1010, one or more memories 1020, one or more cameras 1030, one or more storage devices 1040, one or more output devices 1060, and one or more network interfaces 1070, as well as an example bus 1080 providing communication and data exchange between the example components.

The processor 1010 is configured to perform one or more, any combination, or all operations described herein. For example, the processor 1010 may be configured to perform one or more, any combination, or all operations related to the aforementioned registration process and/or verification process. For example, the processor 1010 may be configured to acquire, or control the acquiring or capturing of, a verification image, analyze a current frame of the verification image, determine a current frame state score of the verification image indicating whether the current frame is in a state appropriate for verification, extract one or more features from the current frame in response to the current frame state score satisfying a predetermined validity condition, and perform verification by comparing similarities between the one or more extracted features and one or more registered features based on a set verification threshold. The processor 1010 may be configured to implement similar situation and score analyses and extraction of features, and control the storing of the same in the memory 1020, for example. In addition, the processor 1010 may be configured to dynamically adjust the verification threshold as discussed above in FIGS. 1-9.

The memory 1020 is a non-transitory computer readable medium and stores computer-readable instructions, which when executed by the processor 1010, cause the processor 1010 to perform one or more, any combination, or all operations related to the registration processes and/or verification processes described above with respect to FIGS. 1-9. Also, the memory 1020 may store resultant data associated with the aforementioned registration and verification.

The verification apparatus 1000 is connected to an external device, for example, a PC and a network, via an input and output device to perform a data exchange. The verification apparatus 1000 is implemented as at least a portion of, or in whole as, for example, a mobile device such as a mobile phone, a smartphone, a PDA, a tablet computer, a laptop computer, and the like, a computing device such as a PC, a tablet PC, a netbook, and the like, and electronic products such as a TV, a smart TV, security equipment for gate control, and the like.

The one or more cameras 1030 captures a still image, a video, or both, such as based upon control of the processor 1010. For example, one or more of the cameras 1030 may capture a face region to be input by a user attempting at the face verification.

The storage device 1040 may be another memory and includes a computer-readable storage medium or a computer-readable storage device, for example. The storage device 1040 may also store a database including information, for example, registration features, registered in the face registering process and corresponding situation information and/or state scores. In one example, the storage device 1040 is configured to store a greater amount of information than the memory 1020, and configured to store the information for a longer period of time than the memory 1020, noting that alternative examples are also available. For example, the storage device 1040 may include, for example, a magnetic hard disk, an optical disc, a flash memory, a floppy disk, and nonvolatile memories in other forms that are well-known in the technical field to which the present disclosure pertains.

The one or more input devices 1050 are respectively configured to receive or detect input from the user, for example, through a tactile, video, audio, or touch input. The one or more input devices 1050 may include a keyboard, a mouse, a touch screen, a microphone, and other devices configured to detect an input from a user, or detect an environmental or other aspect of the user, and transfer the detected input to the processor 1010, memory 1020, and/or storage device 1040.

The one or more output devices 1040 may be respectively configured to provide the user with an output of the processor 1020, such as a result of the verification and/or registration operations, through a visual, auditory, or tactile channel configured by the one or more output devices 1040.

The one or more output devices 1040 may further be configured to output results or information of other processes of the verification apparatus 1000 in addition to the verification and registration operations. In an example, the one or more output devices 1040 may include a display, a touch screen, a speaker, a vibration generator, and other devices configured to provide an output to the user, for example. The network interface 1070 is a hardware module configured to perform communication with one or more external devices through one or more different wired and/or wireless networks. The processor 1010 may control operation of the network interface 1070, for example, such as to acquire registration information from a server or to provide results of such registration or verification to such a server. The network interface 1070 may also be configured to communicate with local Internet of Things (IoT) or other electronic components that may be selectively controlled, e.g., by the processor 1010 or by their respective processors, depending on the result of the verification, for example. In an example, such other electronic components may include an access control system, such as to a restricted area or for entry to room or building, or banking system, such as an automated teller machine, or other financial devices for authorizing financial transactions dependent on results of the verification, noting that still further embodiments are also available.

The verification apparatuses 100, 700, and 1000, processor 1010, memory 1020, camera 1030, storage device 1040, input device 1050, output device 1060, and network interface 1070 in FIGS. 1-10B and that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 1-10B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A mobile device, comprising:
one or more processors configured to:
obtain an image for a user's face;
ascertain whether a user distance from the user to the mobile device is within a threshold range of distances;
select to not perform a user verification when the user distance is ascertained to not be within of the threshold range of distances; and
when the user verification verifies the user, dependent on the image, unlock the mobile device to permit the user to access functions of the mobile device.

2. The mobile device of claim 1, comprising at least one processor and a memory storing instructions that configure the at least one processor to perform the user verification, including implementation of a machine learning verification model with respect to the image.

3. The mobile device of claim 2, wherein the one or more processors are further configured to determine a result of the performed user verification through consideration of a similarity, with respect to registered verification information and a result of the implementation of the machine learning verification model.

4. The mobile device of claim 2, wherein the machine learning verification model includes a neural network.

5. The mobile device of claim 2, wherein the at least one processor is a processor of the one or more processors.

6. The mobile device of claim 1, wherein the threshold range is 15 cm to 90 cm.

7. The mobile device of claim 6, wherein the threshold range is 20 cm to 50 cm.

8. The mobile device of claim 1, wherein the mobile device is a mobile phone.

9. The mobile device of claim 1, wherein the mobile device is a tablet.

10. The mobile device of claim 1, wherein the mobile device is a laptop.

11. The mobile device of claim 1, wherein the one or more processors are further configured to perform the user verification, including determining a result of the user verification by considering a similarity between registered verification information and verification information extracted with respect to the image.

12. The mobile device of claim 1, further comprising a display, wherein the one or more processors are further configured to provide an indication on the display of whether the user verification verifies the user.

13. The mobile device of claim 1, wherein the one or more processors are further configured to perform the user verification when the selection to not perform the user verification is not selected to not be performed.

14. The mobile device of claim 1, wherein the one or more processors are further configured to select to perform the user verification when the user distance is ascertained to be within of the threshold range of distances.

15. A processor-implemented method of a device, the method comprising:
obtaining an image for a user's face;
ascertaining whether a user distance from the user to the device is within a threshold range of distances;
selecting to not perform a user verification when the user distance is ascertained to not be within of the threshold range of distances; and
when the user verification verifies the user, dependent on the image, unlocking the device for permitting the user to access functions of the device.

16. The method of claim 15, further comprising performing the user verification, including performing the user verification using a machine learning verification model.

17. The method of claim 16, further comprising determining a result of the performed user verification by considering a similarity, with respect to registered verification information and a result of the implemented machine learning verification model.

18. The method of claim 16, wherein the machine learning verification model includes a neural network.

19. The method of claim 15, further comprising providing a visual indication to the user of whether the user verification verifies the user.

20. The method of claim 15, wherein the device is a mobile phone, a tablet, or a laptop.

21. The method of claim 15, further comprising performing the user verification when the selection to not perform the user verification is not selected to not be performed.

22. The method of claim 15, further comprising selecting to perform the user verification when the user distance is ascertained to be within of the threshold range of distances.

* * * * *